United States Patent [19]

Mason, Jr.

[11] 4,018,472
[45] Apr. 19, 1977

[54] TRACTOR-TRAILER AERODYNAMIC DRAG REDUCER

[75] Inventor: William T. Mason, Jr., Lake Orion, Mich.

[73] Assignee: General Motors Corporation, Detroit, Mich.

[22] Filed: Feb. 4, 1976

[21] Appl. No.: 655,258

[52] U.S. Cl. .................................. 296/1 S; 105/2 R
[51] Int. Cl.² ........................................ B62D 35/00
[58] Field of Search ............. 296/1 S, 91; 105/2 R, 105/2 A; 98/2.14, 2.15, 2.16; D12/96, 181

[56] References Cited

UNITED STATES PATENTS

| | | | |
|---|---|---|---|
| 3,514,023 | 5/1970 | Russell | 296/1 S |
| 3,731,969 | 5/1973 | Bildfell | 296/1 S |
| 3,738,621 | 6/1973 | Anderson | 98/2.14 |
| 3,904,236 | 9/1975 | Johnson | 296/1 S |
| 3,934,923 | 1/1976 | Lissaman | 296/1 S |
| 3,947,065 | 3/1976 | Geiger | 296/1 S |

*Primary Examiner*—John A. Carroll
*Attorney, Agent, or Firm*—Charles E. Leahy

[57] ABSTRACT

A device for reducing the aerodynamic drag on a tractor-trailer is mounted on the tractor roof and includes an upwardly inclined rearwardly extending top surface having its leading edge faired into the tractor roof. The device has side walls which extend generally vertically to connect the outer edge of the top surface of the device with the roof of the tractor. A central portion of the leading edge is recessed rearwardly of a roof mounted equipment device and defines a central top surface portion which extends upwardly from the recessed leading edge into tangency with the top surface. Laterally spaced walls depend vertically from the inboard edges of the top surface portions spaced laterally of the central top surface portion and merge with the central top surface portion and the tractor roof to cooperate therewith and with the roof mounted equipment device to define a recessed channel which imparts a low drag streamline curvature to the airflow. An opening is provided in the central top surface portion to receive a rearward portion of an air conditioning unit within the confines of the drag reducing device.

3 Claims, 7 Drawing Figures

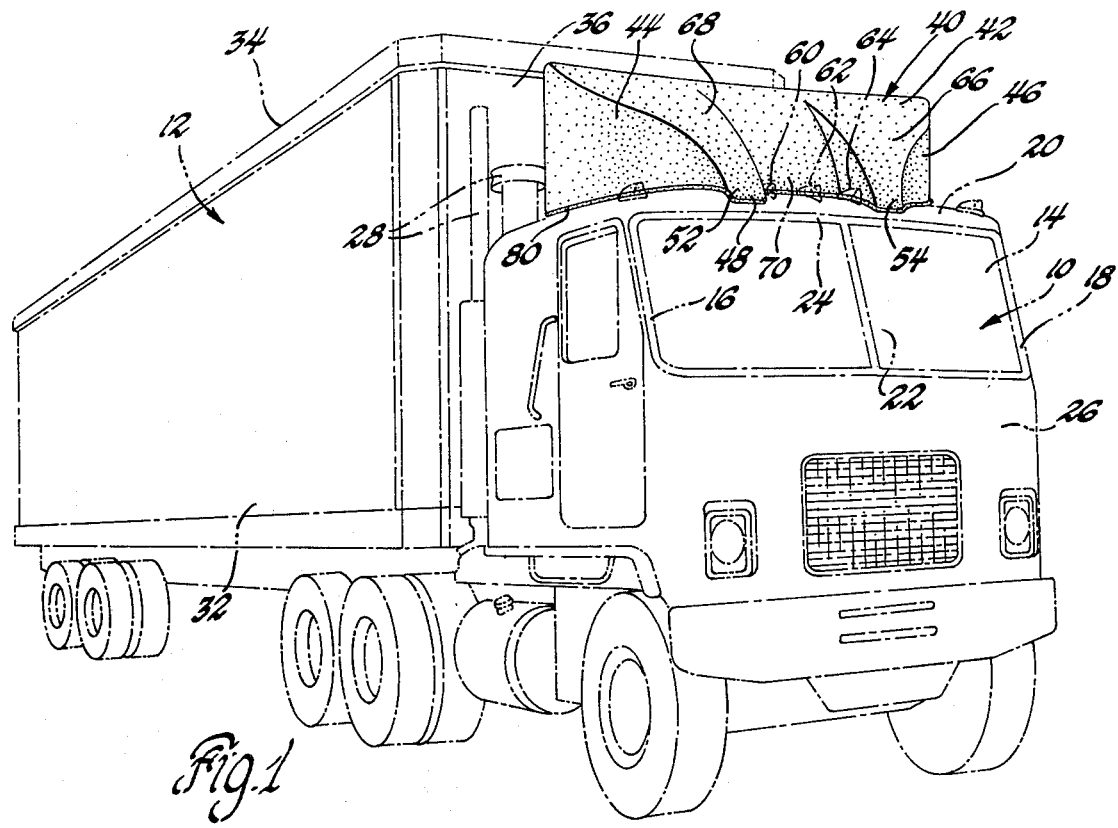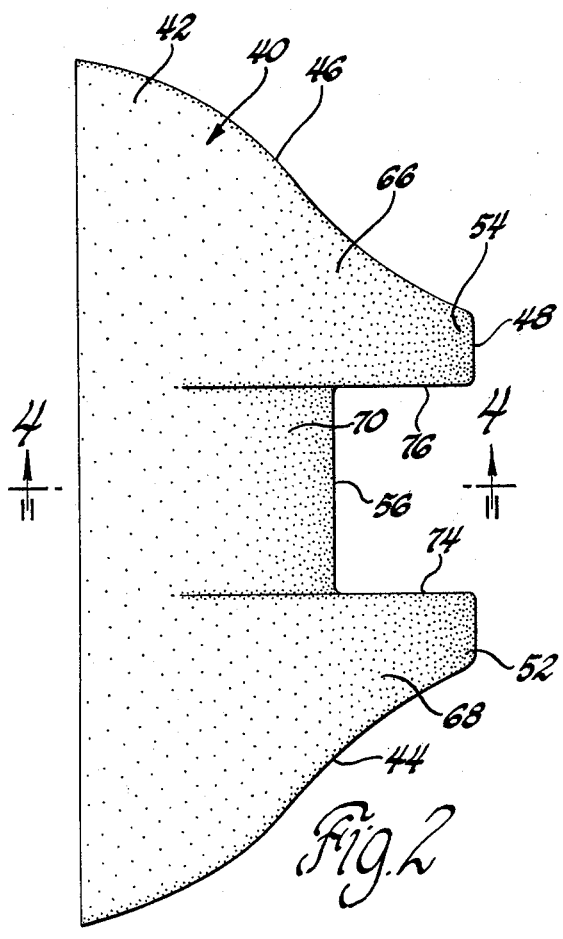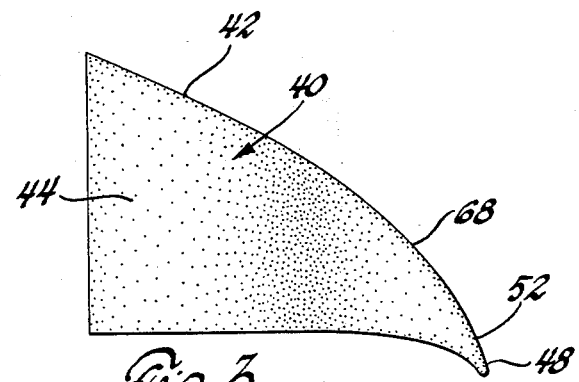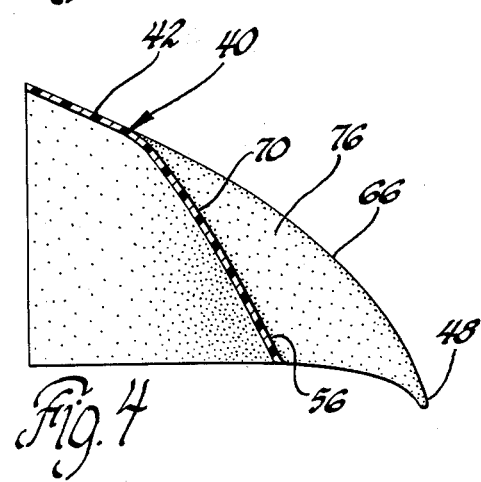

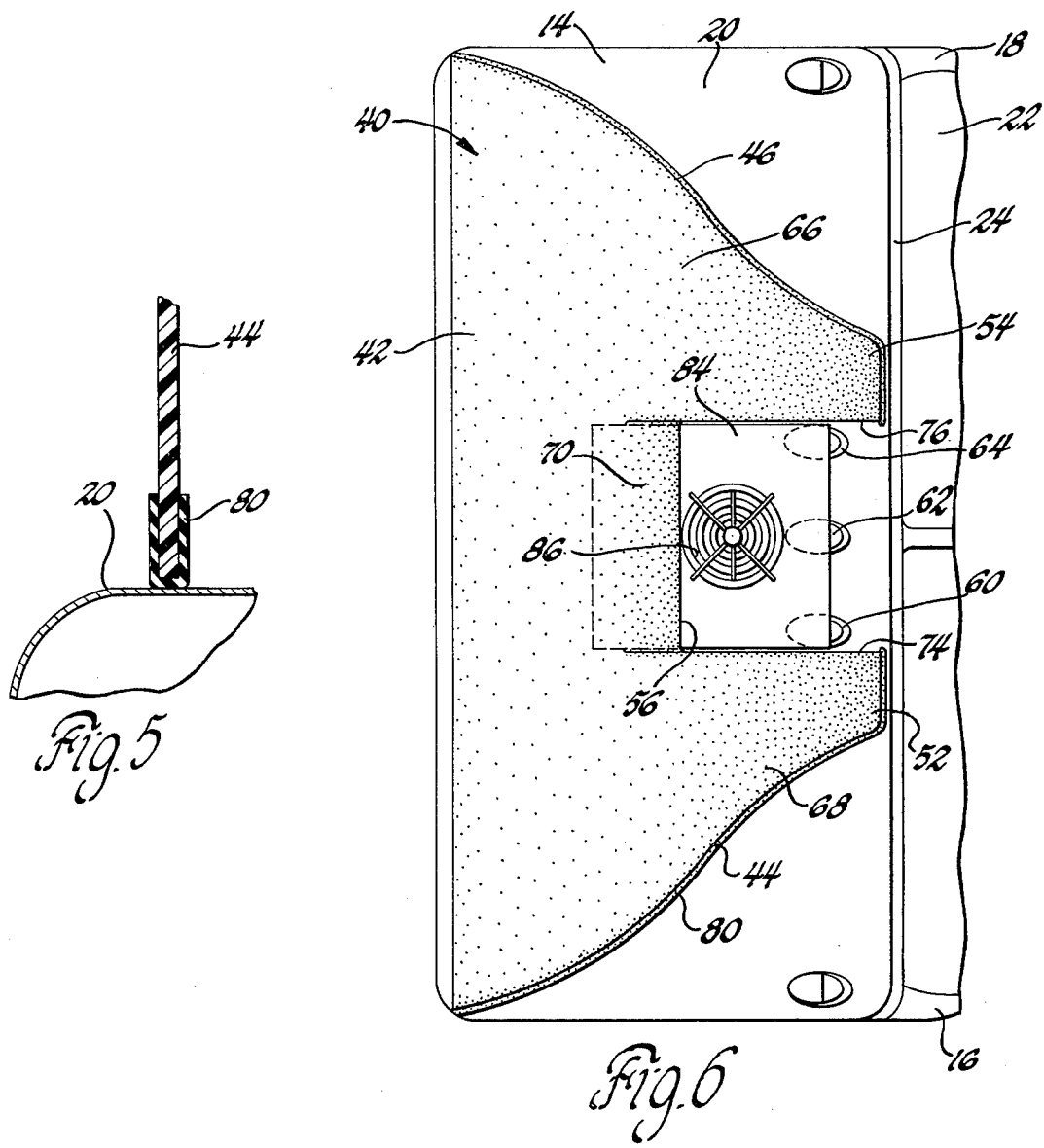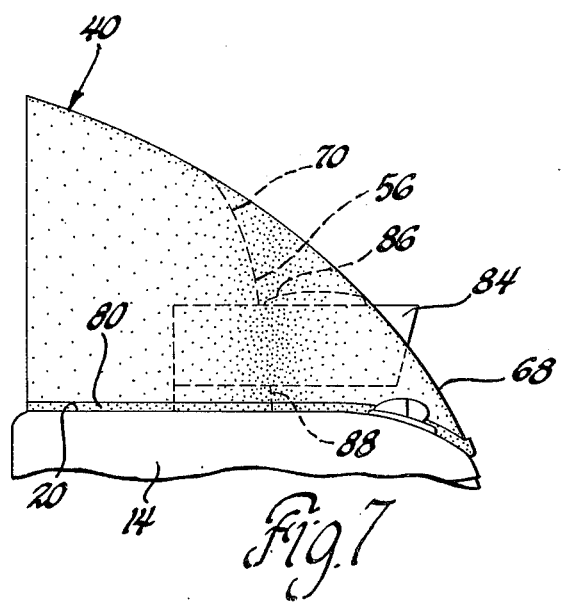

TRACTOR-TRAILER AERODYNAMIC DRAG REDUCER

The invention relates to a drag reducing device for improving the aerodynamic characteristics of a tractor-trailer vehicle.

My copending patent application Serial No. 514,638, now U.S. Pat. No. 3,972,556, issued Aug. 3, 1976, discloses a device for reducing tractor-trailer aerodynamic drag. The aerodynamic drag reducer of that invention includes an air deflecting device mounting on the tractor roof and having its leading edge faired into the leading edge of the tractor roof. The device has a top surface which is inclined and extends rearward toward the trailing edge of the tractor roof. The rearward inclination of the device's upper surface directs the airflow smoothly over the roof of the tractor to eliminate the high static pressure area on the front of the trailer and eliminate the strong downflow between the tractor and trailer, thus providing a reduction in the aerodynamic drag of the tractor-trailer. The width of the device is substantially less at its leading edge than at its trailing edge. A generally vertical wall is provided to connect the outer edge of the top surface of the device with the roof of the tractor. This planform shaping directs the airflow smoothly around the upper sides of the trailer and is especially beneficial when the vehicle encounters side cross winds.

A disadvantage of such a generally wedge-shaped drag reducing device is that it occupies substantially the full area of the tractor roof and thereby interferes with the location of roof mounted equipment devices such as roof mounted air conditioning units and lighting clusters. The lighting clusters cannot be relocated to accommodate the drag reducing device because the location of the lighting cluster is mandated by governmental regulation.

The present invention relates to improvements in the aforedescribed drag reducing device for the accommodation of roof mounted equipment devices.

One feature of the invention is that the leading edge of a central portion of the top surface is recessed rearwardly of the roof mounted equipment device. A further feature of the invention is that the central top surface portion diverges upwardly and rearwardly from the recessed leading edge into tangency with the top surface. A still further feature of the invention is that laterally spaced walls depend vertically from the inboard edges of the top surface portions spaced laterally of the central top surface portion and merge with the central top surface portions and the tractor roof to cooperate therewith and with the roof mounted equipment device to define a recessed channel which imparts a low-drag streamline curvature to the airflow. Another feature of the invention is that an opening may be provided in the central top surface portion to receive a portion of an air conditioning unit within the drag reducing device.

These and other objects, features and advantages of the invention will become apparent upon consideration of the specification and the appended drawings in which:

FIG. 1 is a perspective view of a tractor-trailer vehicle with a drag reducing device according to the invention;

FIG. 2 is a plan view of a drag reducing device of the invention;

FIG. 3 is a side elevation view of the drag reducing device of FIG. 2;

FIG. 4 is a sectional view taken in the direction of arrows 4—4 of FIG. 2;

FIG. 5 shows a seal which is provided at the interface between the drag reducing device and the tractor roof;

FIG. 6 is a plan view showing the drag reducing device installed on a tractor having a roof mounted lighting cluster and air conditioning unit; and FIG. 7 is a side elevation view of the installation shown in FIG. 6.

Referring to FIG. 1, a conventional tractor-trailer vehicle includes a tractor 10 and a trailer 12. The tractor 10 has a cab-over-engine configuration but alternatively could be a sleeper cab-over-engine or a conventional configuration. The cab 14 of the tractor 10 includes windshield pillars 16 and 18 which support the cab roof 20. The windshield 22 is flush with the windshield pillars 16 and 18, a windshield header 24 and a front panel 26 of the cab 14 so that the front of the cab 14 presents a bluff contour to the approaching air stream.

The conventional trailer has rectangular shape and includes sides 32, a roof 34 and a front wall 36. The cab 14 of the tractor 10 and the front wall 36 of the trailer 12 are spaced longitudinally of one another so that the tractor 10 can turn relative to the trailer 12. The roof 20 of the tractor is at a lower elevation than the roof 34 of the trailer 12.

As best seen in FIGS. 1 and 2, a three dimensional drag reducing device, generally indicated at 40, is mounted on the tractor roof 20. The drag reducing device 40 is generally wedge shaped and includes a top surface 42 for directing airflow over the top of the trailer and laterally spaced side walls 44 and 46 for directing airflow around the upper sides of the trailer. The device has a leading edge 48 which is faired into the tractor roof 20. The top surface 42 of the device 40 extends upwardly and rearwardly from the leading edge 48. The leading edge 48 of the device 40 is of lesser width than the width of the cab 14, resulting in an outward divergence of side walls 44 and 46 as they extend rearwardly toward the rear of the cab roof. The drag reducing device 40 is truncated so as not to interfere with exhaust and/or air stacks 28 or interfere with the front wall 36 of the trailer 12 as the tractor 10 turns relative the trailer 12.

As best seen in FIGS. 2 and 4, the lesser width of the drag reducing device 40 at the leading edge 48 defines outboard leading corners 52 and 54. The leading edge 48 has a central portion 56 which is recessed rearwardly of the outboard corners 52 and 54 of the leading edge 48 and rearwardly of the roof mounted equipment device such as the cluster of lamps 60, 62, and 64 shown in FIG. 1. The rearwardly recessed central portion 56 of the leading edge 48 divides the top surface 42 into a pair of laterally spaced outboard top surface portions 66 and 68 and a central top surface portion 70. The central top surface portion 70 diverges upwardly and rearwardly from its leading edge 56 into tangency with the top surface 42 and the laterally spaced outboard top surface portions 66 and 68. As best seen in FIGS. 2 and 4, laterally spaced side walls 74 and 76 depend generally vertically from the inboard edges of the laterally spaced top surface portions 66 and 68. The side walls 74 and 76 merge into the central top surface portion 70 and engage the tractor roof 20. The side walls 74 and 76 cooperate with the central top surface portion 70, the tractor roof 20 and the roof mounted lighting cluster to define a recessed channel which imparts a low-drag streamline curvature to the airflow.

Referring to FIG. 5, it is seen that a generally U-shaped elastomeric seal 80 is engaged over the edges of drag reducing device and sealingly engages the tractor roof 20.

Referring to FIG. 6, there is shown a tractor roof having mounted thereon a light cluster comprised of lamps 60, 62, and 64 as well as an air conditioning unit 84. The air conditioning unit 84 has an air outlet opening 86 on the top surface thereof. As best seen in FIG. 6, the side walls 74 and 76 of the drag reducing device 40 are located adjacent the end walls of the air conditioning unit 84. As best seen in FIG. 7, the curvature of the central top surface portion 70 is such that the rearwardly recessed leading edge 56 intersects the air conditioning unit 84 at a point just rearwardly of the air outlet 86. A filler panel 88 is provided beneath the bottom of the air conditioning unit 84 and engages the tractor roof 20 to prevent airflow therebetween. In the alternative, a rectangular opening may be cut into the central top surface portion 70 to accommodate entry of the rearward end of the air conditioning unit 84. The side walls 74 and 76 are closely juxtaposed the end walls of the air conditioning unit so that the unit 84 substantially fills the recessed channel provided in the drag reducing device 40.

It is to be understood that the extent of rearward recessing of the central portion 56 of the leading edge, the location of the side walls 74 and 76, and the radius of curvature of the central top surface portion 70 may be varied as dictated by the location and size of the clearance light cluster or air conditioning unit.

I claim:

1. A tractor-trailer aerodynamic drag reducer for use on the roof of a tractor having roof mounted equipment and comprising: a generally wedge-shaped body having a top surface with a leading edge faired into the tractor roof, the top surface extending rearwardly from the leading edge and diverging upwardly from the tractor roof to streamline airflow over the trailer roof, the wedge-shaped body having side surfaces extending generally vertically between the top surface and the tractor roof with the juncture of the side surfaces and the tractor roof following a curvilinear path providing a concave-convex contour to the side surfaces to divert air smoothly around the sides of the trailer and to streamline crosswind airflow to reduce aerodynamic drag on the tractor-trailer vehicle, the leading edge of the top surface having a central portion recessed rearwardly of outboard portions of the leading edge to accommodate roof mounted equipment, said rearwardly recessed central portion of the leading edge dividing the top surface into a pair of laterally spaced outboard top surface portions and a central top surface portion, the central top surface portion diverging upwardly and rearwardly from the central portion of the leading edge and into tangency with the top surface, and a pair of laterally spaced walls depending generally vertically from the laterally spaced top surface portions to the tractor roof and to the central top surface portion to cooperate with the central top surface portion, the tractor roof and the roof mounted equipment to define a recessed channel which imparts a low-drag streamline curvature to the airflow.

2. In combination with a tractor-trailer vehicle including a tractor having a roof and an equipment device mounted on the tractor roof, an aerodynamic drag reducer mounted on the tractor roof and comprising: a generally wedge-shaped drag reducing device having a top surface with a leading edge faired into the tractor roof, the top surface extending rearwardly from the leading edge and diverging upwardly from the tractor roof to streamline airflow around the tractor and over the trailer roof, the leading edge of the device being of lesser width than the width of the tractor roof and defining outboard leading corners of the top surface, the drag reducing device having side surfaces extending generally vertically between the top surface and the tractor roof and diverging toward the respective outboard edges of the tractor roof, the juncture of the side surfaces and the tractor roof following a curvilinear path providing a concave-convex contour to the side surfaces to divert air smoothly around the sides of the trailer and to streamline crosswind airflow to reduce aerodynamic drag on the tractor-trailer vehicle, the leading edge of the top surface having a central portion recessed rearwardly of the outboard corners of the leading edge and rearwardly of the roof mounted equipment device, said rearwardly recessed central portion of the leading edge dividing the top surface into a pair of laterally spaced outboard top surface portions and a central top surface portion, the central top surface portion diverging upwardly and rearwardly into tangency with the top surface, and a pair of laterally spaced walls depending generally vertically from the laterally spaced outboard top surface portions to the tractor roof and to the central top surface portion to cooperate with the central top surface portion, the tractor roof and the roof mounted equipment device to define a recessed channel which imparts a low-drag streamline curvature to the airflow thereby drag reducing effectiveness is maintained and a roof mounted equipment device is accommodated.

3. A tractor-trailer aerodynamic drag reducer for use on the roof of a tractor having roof mounted lamps and a roof mounted air conditioning unit with a air outlet opening in the top surface thereof, said drag reducer comprising: a generally wedge-shaped body having a top surface with a leading edge faired into the tractor roof, the top surface extending rearwardly from the leading edge and diverging upwardly from the tractor roof to streamline airflow over the tractor roof, the wedge-shaped body having side surfaces extending generally vertically between the top surface and the tractor roof with the juncture of the side surfaces and the tractor roof following a curvilinear path providing a concave-convex contour to the side surfaces to streamline airflow around the side of the trailer, the leading edge of the top surface having a central portion recessed rearwardly of outboard portions of the leading edge, said rearwardly recessed central portion of the leading edge dividing the top surface into a pair of laterally spaced outboard top surface portions and a central top surface portion, the central top surface portion diverging upwardly and rearwardly into tangency with the top surface and having an opening therein to receive a rearward portion of the air conditioning unit inside the wedge-shaped body, the central top surface portion contacting the top surface of the air conditioning unit rearwardly of the air outlet opening, and a pair of laterally spaced walls depending generally vertically from the laterally spaced top surface portions and juxtaposed with the air conditioning unit whereby the air conditioning unit substantially fills the recessed channel defined by the tractor roof, the central top surface portion and the pair of laterally spaced walls.

* * * * *